United States Patent [19]

Noack et al.

[11] 4,160,592

[45] Jul. 10, 1979

[54] CAMERAS

[75] Inventors: Rolf Noack; Karl Kromer, both of Dresden, German Democratic Rep.

[73] Assignee: Veb Pentacon Dresden Kamera und Kinowerke, Dresden, German Democratic Rep.

[21] Appl. No.: 831,652

[22] Filed: Sep. 8, 1977

[30] Foreign Application Priority Data

Sep. 24, 1976 [DD] German Democratic Rep. ... 194968

[51] Int. Cl.² .......................... G03B 9/40; G03B 19/12
[52] U.S. Cl. ..................................... 354/246; 354/153
[58] Field of Search ............... 354/226, 154, 152, 153, 354/245–249

[56] References Cited

U.S. PATENT DOCUMENTS 3,988,754 10/1976 Rentschler et al. ................... 354/246
3,999,196 12/1976 Inoue ................................... 354/154

FOREIGN PATENT DOCUMENTS 1224558 3/1971 United Kingdom .................... 354/246
1245056 9/1971 United Kingdom .................... 354/153

Primary Examiner—Donald A. Griffin
Attorney, Agent, or Firm—William A. Drucker

[57] ABSTRACT

The lamellar focal-plane shutter for monocular mirror reflex cameras comprises a swivelling viewfinder mirror and shutter blades returning automatically to their starting positions after each exposure operation. The intrinsically stationary end of an opening spring which is connected to an opening lever is fastened to a first tensioning plate and the intrinsically stationary end of a closing spring, which is connected to a closing lever, is fastened to a second tensioning plate. Both tensioning plates are interconnected by a coupling rod which is tensioned against the action of a return spring upon the winding and cocking action of the camera. The rod is held in this tensioned position by a detent lever which can be actuated for the release of the coupling rod by means of a releasing arm which is moved back to its start position when the viewfinder mirror returns to the observing position.

3 Claims, 11 Drawing Figures

Fig. 1.
Fig. 1a.
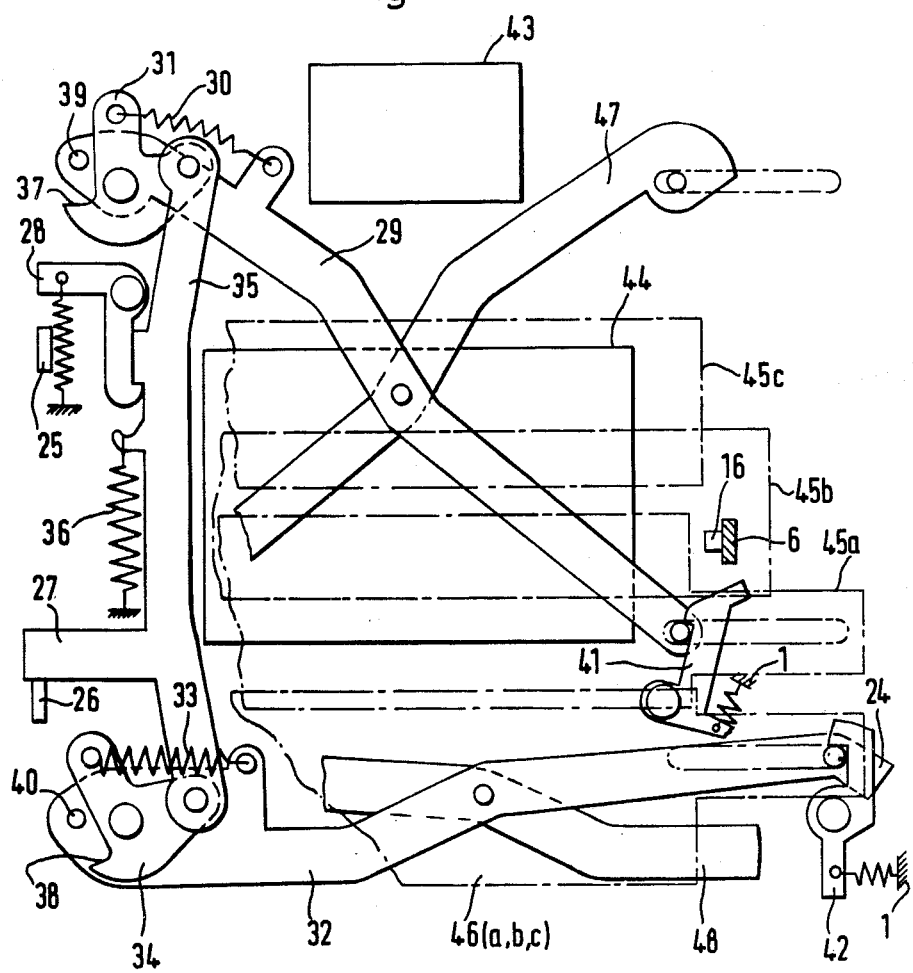
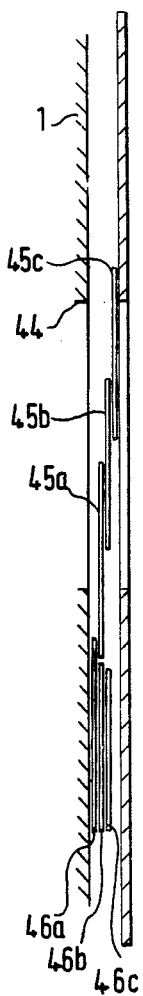

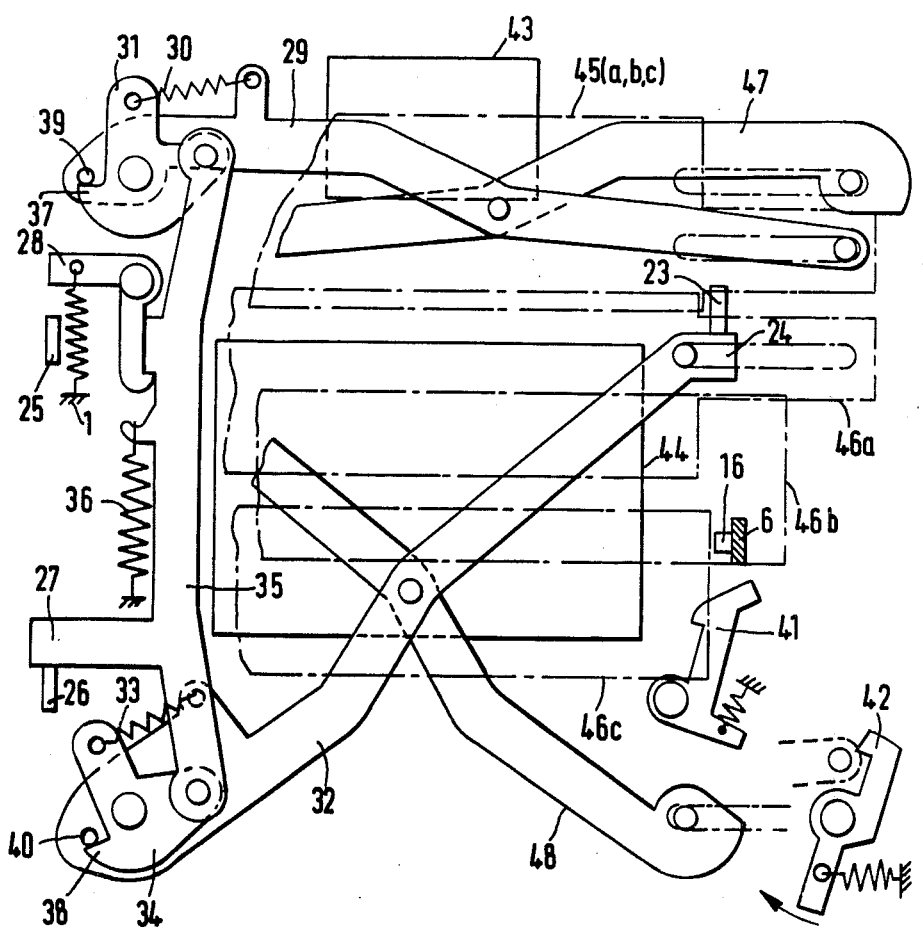
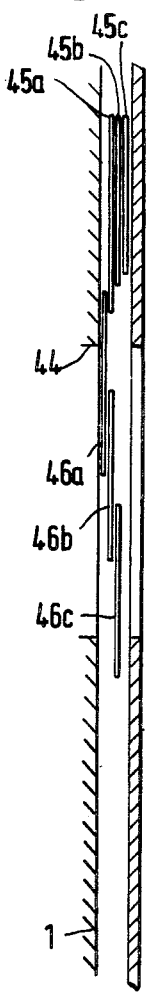
Fig.5.
Fig.5a.

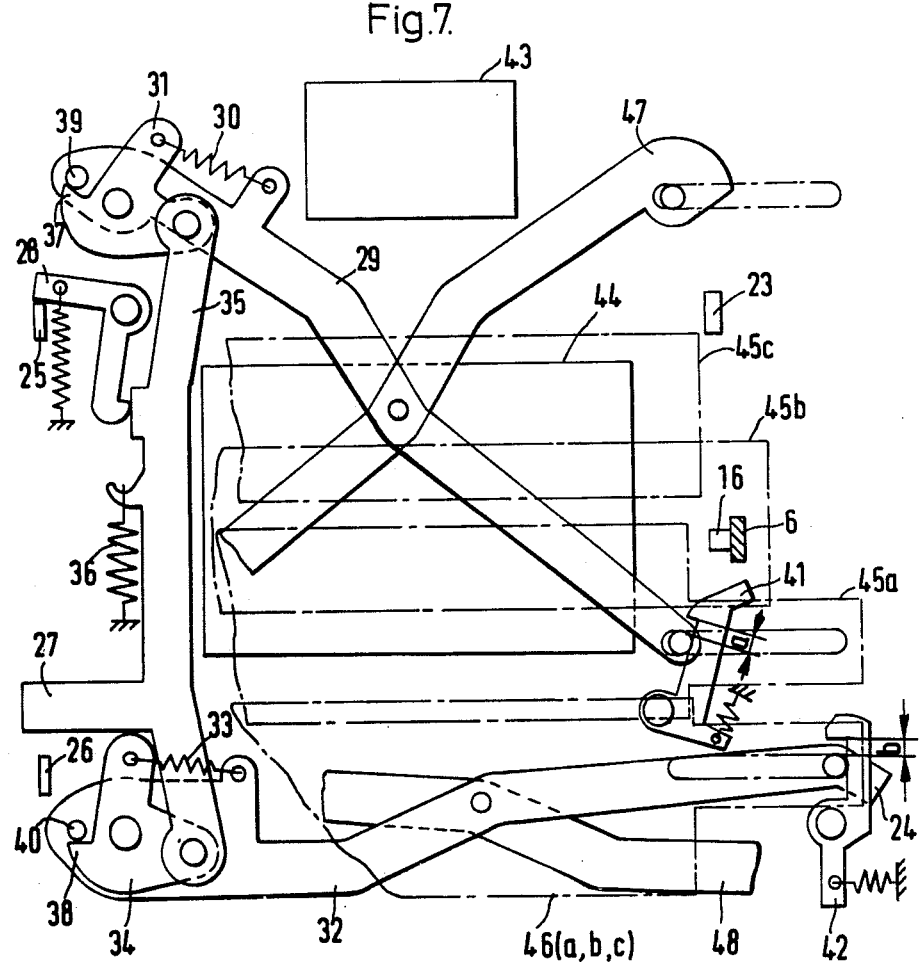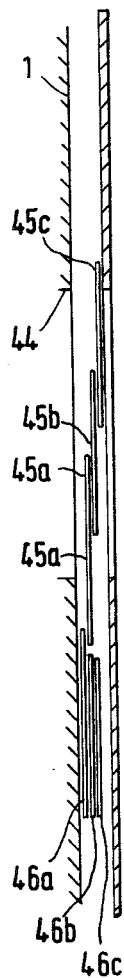

CAMERAS

BACKGROUND OF THE INVENTION

The invention relates to a lamellar focal-plane shutter for monocular mirror reflex cameras comprising a swivelling viewfinder mirror, with the shutter blades and the viewfinder mirror automatically returning to their starting positions after each exposure operation.

In a known arrangement of this kind, only the opening blades are returned to their position covering the picture window when the viewfinder mirror returns to its initial viewfinder position, while the closing blades remain in their position covering the picture window. The returning of only the opening blades causes these to be put into the same position in which the closing blades already are. Consequently, the space for the movement of the closing blades has to be sufficiently large in the direction of the optical axis, which, inter alia, runs counter to the aspiration to reduce the external camera dimensions.

Aiming at preventing the need for any additional space requirement, the object of the invention is to provide a device for the simultaneous return of the opening and closing blades to their starting positions.

SUMMARY OF THE INVENTION

According to the invention, this is achieved in that the intrinsically stationary end of the opening spring connected to the opening lever is fastened on a first tensioning plate and the intrinsically stationary end of the closing spring connected to the closing lever is fastened on a second tensioning plate and in that the two tensioning plates are connected by a coupling rod which can be tensioned against the action of an adjusting spring upon the winding of the camera and can be held in this tensioned position by a detent lever which is actuatable, for the release of the coupling rod, by means of a releasing arm which is movable to the observation position upon the return of the viewfinder mirror. Expediently, the releasing arm is arranged on the return lever for the viewfinder mirror.

In accordance with an advantageous construction, the tensioning disc is mounted concentrically to the opening lever and the closing lever respectively and comprises a stop by means of which, due to the driver, the opening lever and the closing lever can be moved by a path, a, b beyond the position thereof, which is defined by the opening pawl and the closing pawl.

BRIEF DESCRIPTION OF THE DRAWINGS

The invention will be explained with reference to an illustrated and described exemplified embodiment.

In the drawings:

FIG. 1 shows the shutter in the cocked position,

FIG. 1a shows the corresponding blade position in a lateral view,

FIG. 5 shows the shutter after the exposure operation has been completed,

FIG. 5a shows the corresponding blade position in a lateral view,

FIG. 7 shows the shutter after the return to its position of rest, and

FIG. 7a shows the corresponding blade position in a lateral view.

DESCRIPTION OF PREFERRED EMBODIMENT

Figure 2:
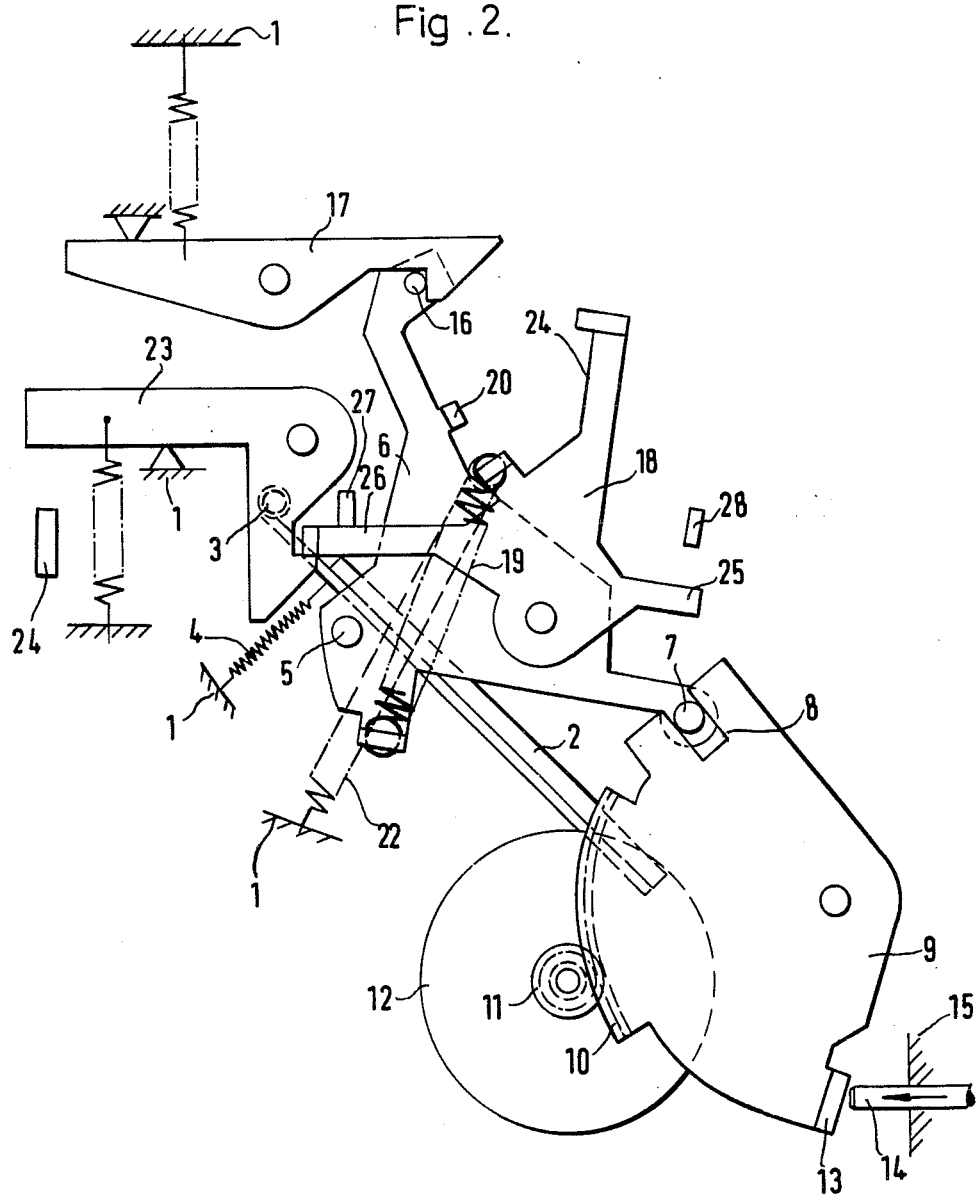
FIG. 2 shows the mirror mechanism in the tensioned position.

In the camera housing 1 (see FIG. 1), there is provided the viewfinder aperture 43 and thereunder the picture window 44. The picture window 44 is closable by the opening blades 45 (*a, b, c*) and the closing blades 46 (*a, b, c*). The opening blades 45 are movable by the opening lever 29 and its scissors-shaped lever 47; the closing blades 46 are movable by the closing lever 32 and its scissors-shaped lever 48. The opening spring 30 is fastened to the opening lever 29, on the one hand, and to the tensioning plate 31, on the other hand; the closing spring 33 is fastened accordingly at one end to the closing lever 32 and at the other end to the tensioning plate 34. The opening lever 29 includes a driver 39 which is arranged in the swivel path of the stop 37 of the tensioning plate 31. The closing lever 32 includes a driver 40 which is arranged in the swivel path of the stop 38 of the tensioning plate 34. The opening lever 29 is retainable by the opening pawl 41 against the action of the opening spring 30 and the closing lever 32 is retainable by the closing pawl 42 against the action of the closing spring 33. The two tensioning plates 31 and 34 are connected by the coupling rod 35. The coupling rod 35 is movable by the adjusting spring 36 and is retainable by the detent lever 28 against the action of the adjusting spring 36.

The viewfinder mirror 2 is also mounted in the camera housing 1 so that it can be rotated about the shaft 3 (see FIG. 2). The follower spring 4 holds the viewfinder mirror 2 in engagement with the eintrainment pin 5 of the drive lever 6. The driver pin 7 of the drive lever 6 projects into the recess 8 of the actuating rocker arm 9. The actuating rocker arm 9 includes a toothed segment 10 which meshes with the driver wheel 11 of the retarding disc 12. Resting against the actuating tab 13 of the actuating rocker arm 9 is the adjusting tappet 14 of a preselection diaphragm arranged in the attachable lens housing, which tappet is spring-loaded in the direction of the arrow.

The drive lever 6 is held on the locking pin 16 by means of the releasing pawl 17. The return lever 18 is mounted concentrically to the drive lever 6 in a rotatable manner. The drive spring 19 is secured between the drive lever 6 and the return lever 18 and seeks to place the stop tab 20 of the drive lever 6 against the stop edge 21 of the return lever 18. The return lever 18 is loaded by the return spring 22 which is anchored in the camera housing 1. The return lever 18 is held in the cocked position by the lock pawl 23 which is actuatable by the shutter member 24.

Figure 3:
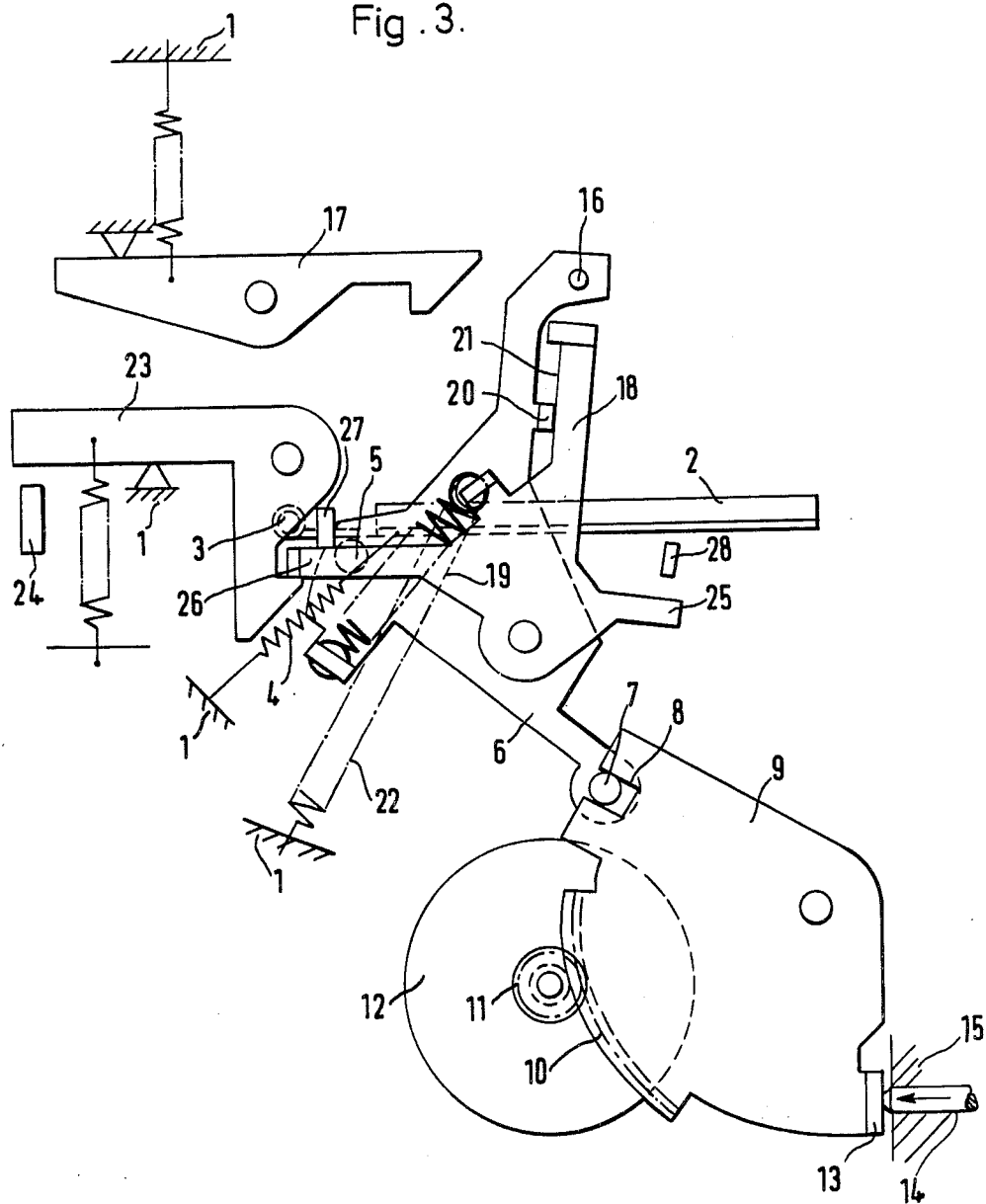
FIG. 3 shows the mirror mechanism in the photographing position.

The mode of operation of the arrangement is as follows:

When the shutter is cocked, the parts are in the positions shown in FIG. 1 or FIG. 1a and FIG. 2. The actuation of the releasing pawl 17 causes the drive lever 6 to be released for the sequence of operations (see FIG. 3) and to be rotated in the clockwise sense, due to the drive spring 19, until the stop tab 20 strikes against the stop edge 21. During this movement, the viewfinder mirror 2 is rotated into the horizontal photographing position via the entrainment pin 5 against the action of the follower spring 4 and the actuating rocker arm 9 is rotated in the anti-clockwise sense into the position shown in FIG. 3 via the driver pin 7. During this process, the adjusting tappet 14 at the lens end is pressed in the sense that is opposite to the direction of the arrow, so that the lens diaphragm is closed to the preselected value. These movements are slightly delayed by the retarding disc 12 so as to avoid any bouncing.

Figure 4:
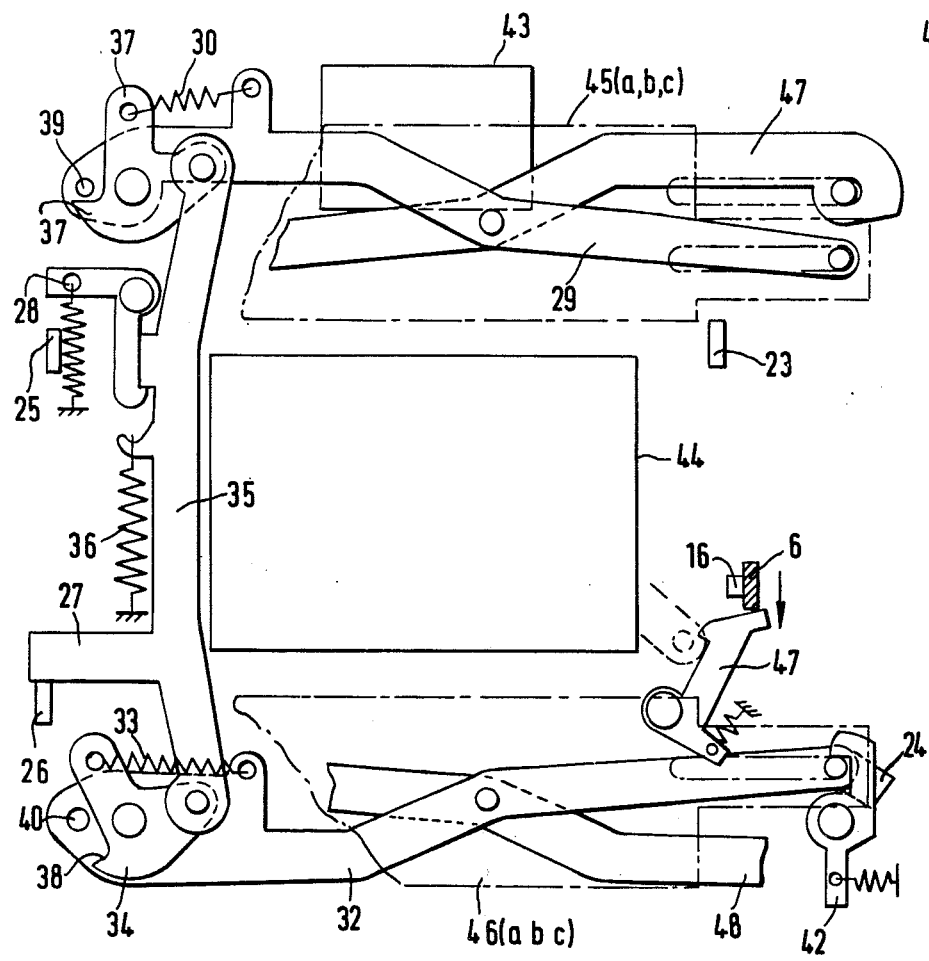
FIG. 4 shows the shutter in the photographing position.
Figure 4A:
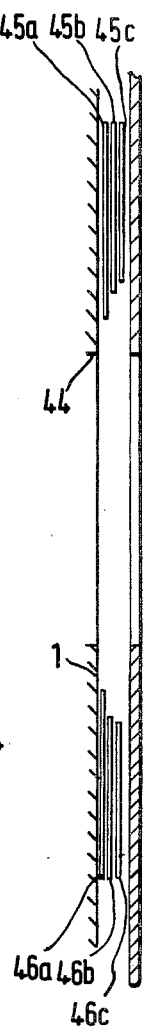
FIG. 4a shows the corresponding blade position in a lateral view.

Thereafter, the drive lever 6 impinges on the opening pawl 41 (see FIG. 4) and swivels this latter in the clockwise sense out of engagement with the opening lever 29. Due to the opening spring 30, the opening lever 29 and the scissors-shaped lever 27 are caused to move the opening blades 45a, 45b, 45c; the opening blades 45 (a, b, c) then assume the position which is also visible in FIG. 4a, so that the picture window 44 is opened for the exposure of a film. The driver 39 of the opening lever 29 comes into contact with the stop 37 of the tensioning plate 31.

After the response of a mechanical or electronic device for the formation of varying exposure times, the closing pawl 42 is swivelled in the clockwise sense in known manner and is brought out of engagement with the closing lever 32. Due to the closing spring 33, the closing lever 32 and the scissors-shaped lever 48 are caused to move the closing blades 46a, 46b and 46c; the closing blades 46 (a, b, c) then assume the position which is shown in FIGS. 5 and 5a and in which the picture window 44 is closed again. The driver 40 of the closing lever 32 comes into contact with the stop 38 of the tensioning plate 54.

Figure 6:
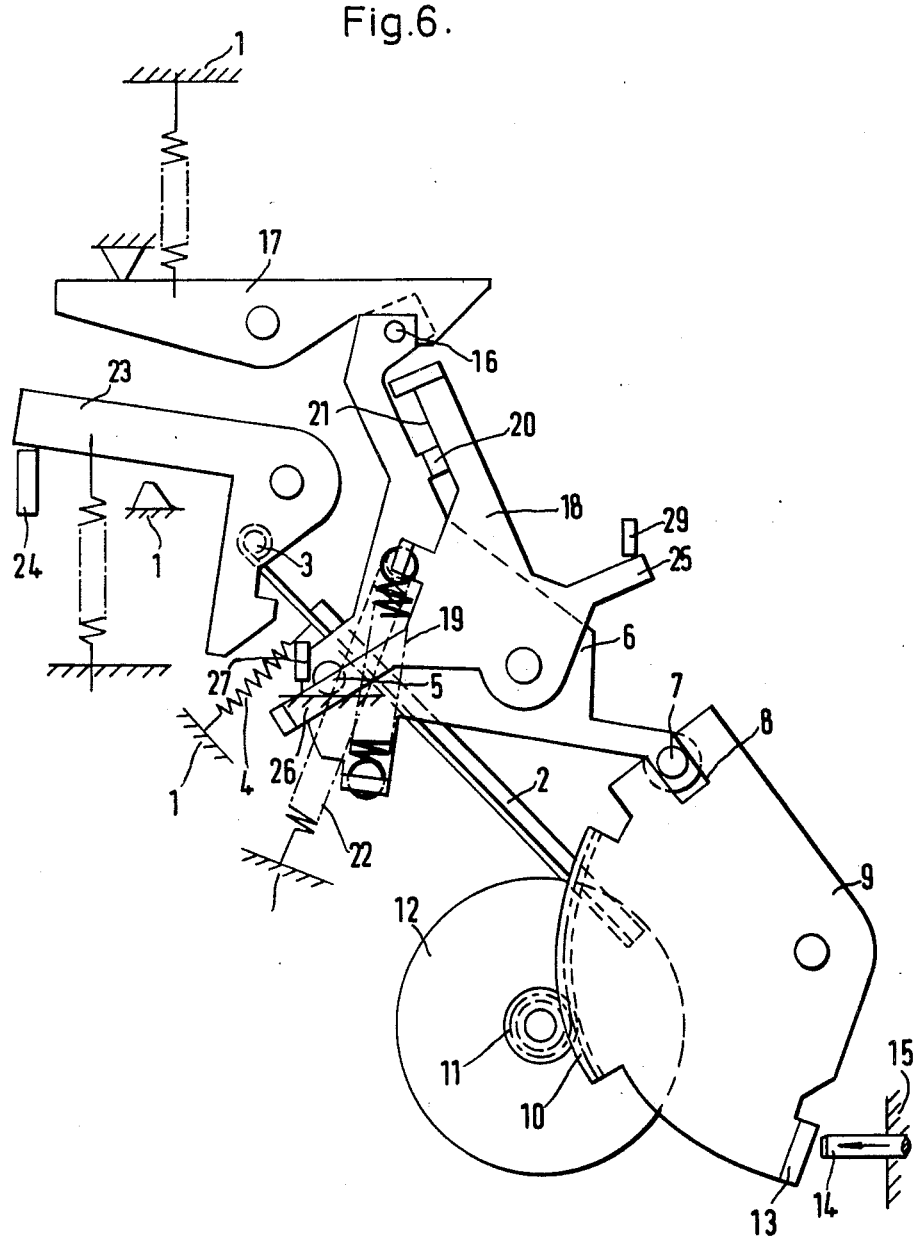
FIG. 6 shows the mirror mechanism after its return to the position of rest.

Upon the completion of its run, the closing lever 32 impinges with its end 24 on the lock pawl 23 and rotates this latter in the clockwise sense out of engagement with the return lever 18 (see FIG. 6). Due to the return spring 22, the return lever 18 is rotated in the anti-clockwise sense, when the drive lever 6 is taken along to its starting position held by the releasing pawl 17. The follower spring 4 allows the viewfinder mirror 2 to follow the entrainment pin 5 again to the viewfinder position. At the same time, the actuating rocker arm 9 is rotated in the clockwise sense, when the adjusting tappet 14 can follow the actuating tab 13, so that the lens diaphragm opens again completely. These return movements are also slightly delayed by the retarding disc 12.

During its continued run, the return lever 18 impinges, with its arm 25, on the detent lever 28 and swivels this latter in the clockwise sense out of engagement with the coupling rod 35 (see FIG. 7). The coupling rod 35 is moved downwards by the adjusting spring 36, so that the two tensioning plates 31 and 34 are rotated in the clockwise sense. During this process, the tensioning plate 31 moves the opening lever 29 by means of the stop 37 via the driver 39 in the clockwise sense and the tensioning plate 34 moves the closing lever 32 in the clockwise sense by means of the stop 38 via the driver 40, so that the opening blades 45 and the closing blades 46 are moved simultaneously to their starting positions. During this return of the opening blades 45 and the closing blades 46, the picture window 44 is not uncovered, so that the film disposed therebehind is not exposed unintentionally. The opening lever 29 and the closing lever 32 are moved by the coupling ros 35 by the paths a and b respectively beyond the positions which are defined by the opening pawl 41 and the closing pawl 42 respectively.

During the renewed tensioning operation, the return lever 18 is again brought into the position shown in FIG. 2. During this process, the coupling rod 35 is taken along, against the action of the adjusting spring 36, by the cocking arm 26 of the return lever 18 via the tab 27 to the position shown in FIG. 1, where it is held by the detent lever 28. During this tensioning movement, the tensioning plates 31 and 34 are rotated in the anti-clockwise sense. The opening spring 30 and the closing spring 33 are tensioned because the opening lever 29 is arrested by the opening pawl 41 and the closing lever 32 is arrested by the closing pawl 42.

We claim:

1. A lamellar focal-plane shutter for monocular mirror reflex cameras having a swivelling viewfinder mirror and shutter blades which return automatically to their starting positions after each exposure operation, comprising
    (a) a first rotatably mounted tensioning plate,
    (b) a shutter opening lever,
    (c) an opening spring connected between said first tensioning plate and said shutter opening lever,
    (d) a second rotatably mounted tensioning plate,
    (e) a shutter closing lever,
    (f) a closing spring connected between said second tensioning plate and said closing lever,
    (g) a coupling rod connected between said first and second tensioning plates,
    (h) a spring attached to said rod for tensioning upon the cocking of the camera,
    (i) a detent lever for holding the rod in a tensioned position and
    (j) a release arm for actuating said detent lever for the release of the coupling rod, said release arm returning to the start position when the viewfinder mirror returns to its viewing position.

2. A lamellar focal-plane shutter according to claim 1, wherein a return lever for the viewfinder mirror pivotally supports the release arm.

3. A lamellar focal-plane shutter according to claim 2, wherein the first and second tensioning plates are mounted concentrically with pivoting axes of the opening lever and the closing lever respectively, each plate including a stop, by means of which, due to a driver, the opening lever and the closing lever respectively can be moved along a path beyond the positions defined by an opening pawl and a closing pawl respectively.

* * * * *